United States Patent
Wen et al.

(10) Patent No.: US 12,210,484 B2
(45) Date of Patent: Jan. 28, 2025

(54) METHOD AND SYSTEM FOR UPGRADING CPE FIRMWARE

(71) Applicants: Gree Electric Appliances, Inc. of Zhuhai, Zhuhai (CN); LEAYUN TECHNOLOGY CO., LTD. OF ZHUHAI, Zhuhai (CN)

(72) Inventors: Ying Wen, Zhuhai (CN); Dechao Song, Zhuhai (CN); Haiying Xian, Zhuhai (CN); Silan Luo, Zhuhai (CN); Zhuoying Huang, Zhuhai (CN)

(73) Assignees: GREE ELECTRIC APPLIANCES, INC. OF ZHUHAI, Guangdong (CN); LEAYUN TECHNOLOGY CO., LTD. OF ZHUHAI, Guangdong (CN)

( * ) Notice: Subject to any disclaimer, the term of this patent is extended or adjusted under 35 U.S.C. 154(b) by 36 days.

(21) Appl. No.: 18/252,485

(22) PCT Filed: Aug. 13, 2021

(86) PCT No.: PCT/CN2021/112539
§ 371 (c)(1),
(2) Date: May 10, 2023

(87) PCT Pub. No.: WO2022/100181
PCT Pub. Date: May 19, 2022

(65) Prior Publication Data
US 2023/0409529 A1    Dec. 21, 2023

(30) Foreign Application Priority Data

Nov. 10, 2020    (CN) .......................... 202011245879.8

(51) Int. Cl.
G06F 16/00    (2019.01)
G06F 16/16    (2019.01)

(52) U.S. Cl.
CPC .......... *G06F 16/168* (2019.01); *G06F 16/162* (2019.01)

(58) Field of Classification Search
None
See application file for complete search history.

(56) References Cited

U.S. PATENT DOCUMENTS

2018/0091326 A1*   3/2018   McLaughlin ....... H04L 41/0893
2018/0091327 A1*   3/2018   McLaughlin ....... H04L 12/2823

FOREIGN PATENT DOCUMENTS

CN    105099840 A    11/2015
CN    106371324 A    2/2017
(Continued)

OTHER PUBLICATIONS

International Search Report for corresponding International Application No. PCT/CN2021/112539, mailed Nov. 1, 2021, 2 pages.
(Continued)

*Primary Examiner* — Bai D Vu
(74) *Attorney, Agent, or Firm* — Armstrong Teasdale LLP

(57) ABSTRACT

This application provides a method and an apparatus for establishing a scene. The method for establishing the scene includes: receiving current state information of all devices in a target folder sent by a terminal, and the target folder is a set of devices that support scene establishment; establishing a target scene according to the current state information; and sending state information corresponding to the target scene to the terminal, and the state information corresponding to the target scene is locally pre-stored according to user demands.

15 Claims, 4 Drawing Sheets

(56) References Cited

FOREIGN PATENT DOCUMENTS

| CN | 108449241 A | 8/2018 | | |
|----|----|----|----|----|
| CN | 109936489 A | 6/2019 | | |
| CN | 110262261 A | 9/2019 | | |
| CN | 111600952 A | 8/2020 | | |
| CN | 111650840 A | 9/2020 | | |
| CN | 111766798 A | 10/2020 | | |
| CN | 111880653 A | 11/2020 | | |
| CN | 112306968 A | 2/2021 | | |
| WO | WO-0150684 A1 * | 7/2001 | ............. | G05B 11/01 |
| WO | 2017107521 A1 | 6/2017 | | |
| WO | 2017162170 A1 | 9/2017 | | |

OTHER PUBLICATIONS

Office Action issued in corresponding Chinese Application 2020112458798 dated Jul. 4, 2023.
European Search Report issued in corresponding EP Application 21890710 dated Mar. 27, 2024.

* cited by examiner

METHOD AND SYSTEM FOR UPGRADING CPE FIRMWARE

CROSS-REFERENCE TO RELATED APPLICATION

This application is a National Stage Entry of International Application No. PCT/CN2021/112539, filed Aug. 13, 2021, which claims priority to Chinese Patent Application No. 202011245879.8, filed to the China National Intellectual Property Administration on Nov. 10, 2020 and entitled "Method and Apparatus for Establishing Scene," the disclosure of which are hereby incorporated by reference in their entirety.

TECHNICAL FIELD

This application belongs to the technical field of smart homes, and specifically relates to a method and an apparatus for establishing a scene, and a computer device and a computer-readable storage medium.

BACKGROUND

With increasing popularization of Internet of Things and smart homes, numerous smart home platform apps, such as MIJIA, Midea Smart Home and Haier Smart Home, currently use conventional If This Then That (IFTTT) in terms of intelligent control devices.

However, the current scene establishment methods are very complicated, and are mainly classified into the following two methods:
1. A user manually adds an execution device and a device state; and
2. A system defaults to a recommended device and a device state, and provides the recommended device and the device state to the user for editing.

In view of problems of complicated scene establishment and low efficiency in the related art, no solution is yet available.

SUMMARY

This application provides a method and an apparatus for establishing a scene, and a computer device and a computer-readable storage medium.

This application uses the following technical solutions.

According to a first aspect, this application provides a method for establishing a scene, the method includes:
current state information of all devices in a target folder sent by a terminal is received, and the target folder is a set of devices that support scene establishment;
a target scene is established according to the current state information;
state information corresponding to the target scene is sent to the terminal, and the state information corresponding to the target scene is locally pre-stored according to user demands.

In some embodiments, after the state information corresponding to the target scene is sent to the terminal, the method further includes: a request sent by the terminal to delete the target scene is received, wherein the request carries an empty target folder; and on a basis of the empty target folder, the state information corresponding to the target scene is deleted.

According to a second aspect, this application provides a method for establishing a scene, the method includes:

at least two or more devices are put into a target folder is detected;
current state information corresponding to the at least two or more devices is sent to a server;
state information corresponding to a target scene which is established by the server according to the current state information of the at least two or more devices is received.

In some embodiments, after the state information corresponding to the target scene which is established by the server according to the current state information of the at least two or more devices is received, the method further includes: according to the state information corresponding to the target scene, the at least two or more devices are controlled to adjust to a state corresponding to the state information from a current state.

In some embodiments, after the state information corresponding to the target scene which is established by the server according to the current state information of the at least two or more devices are received, the method further includes: a name of the target folder that is displayed on a terminal is updated, and the name is synchronized to the server.

In some embodiments, after the state information corresponding to the target scene which is established by the server according to the current state information of the at least two or more devices is received, the method further includes: a third device is put into the target folder is detected; current state information corresponding to all devices of the target folder is sent to the server; and state information corresponding to the target scene which is updated by the server according to the current state information corresponding to all the devices is received.

In some embodiments, after the state information corresponding to the target scene which is established by the server according to the current state information of the at least two or more devices is received, the method further includes: a request of deleting the target scene is received; the target folder is emptied on a basis of the request; and an empty target folder is sent to the server.

According to a third aspect, this application provides an apparatus for establishing a scene, the apparatus includes:
a first receiving unit, configured to receive current state information of all devices in a target folder sent by a terminal, wherein the target folder is a set of devices that support scene establishment;
an establishment unit, configured to establish a target scene according to the current state information; and
a first sending unit, configured to send state information corresponding to the target scene to the terminal, wherein the state information corresponding to the target scene is locally pre-stored according to user demands.

In some embodiments, the first sending unit is further configured, after sending the state information corresponding to the target scene to the terminal, to receive a request sent by the terminal to delete the target scene, wherein the request carries an empty target folder; and on a basis of the empty target folder, delete the state information corresponding to the target scene.

According to a fourth aspect, this application provides an apparatus for establishing a scene, the apparatus includes:
a detection unit, configured to detect that at least two or more devices are put into a target folder;
a second sending unit, configured to send current state information corresponding to the at least two or more devices to a server; and a second receiving unit, configured to receive state information corresponding to a target scene which is established by the server according to the current state information of the at least two or more devices.

In some embodiments, the second receiving unit is further configured, after receiving the state information corresponding to the target scene which is established by the server according to the current state information of the at least two or more devices, to control, according to the state information corresponding to the target scene, the at least two or more devices to adjust to a state corresponding to the state information from a current state.

In some embodiments, the second receiving unit is further configured, after receiving the state information corresponding to the target scene which is established by the server according to the current state information of the at least two or more devices, to update a name of the target folder that is displayed on a terminal, and synchronize the name to the server.

In some embodiments, the second receiving unit is further configured, after receiving the state information corresponding to the target scene which is established by the server according to the current state information of the at least two or more devices, to receive a request of deleting the target scene; empty the target folder on a basis of the request; and send an empty target folder to the server.

According to a fifth aspect, this application provides a computer device, comprising a memory, a processor and a computer program that is stored on the memory and executable on the processor, wherein the processor, when executing the computer program, implements the method for establishing the scene as described in the first aspect and the second aspect.

According to a sixth aspect, this application provides a computer-readable storage medium, having a computer program stored thereon, wherein the method for establishing the scene as described in the first aspect and the second aspect is implemented when the program is executed by a processor.

This application uses the above technical solutions, and at least has the following beneficial effects.

It should be understood that, the above general description and the following detailed description are merely exemplary and explanatory, and cannot limit this application.

BRIEF DESCRIPTION OF THE DRAWINGS

To describe technical solutions in the embodiments of this application or the related art more clearly, the following briefly describes the accompanying drawings required for describing the embodiments or the related art. It is apparent that the drawings in the following descriptions are merely some embodiments of this application. Other drawings can be obtained from those skilled in the art according to these drawings without any creative work.

DETAILED DESCRIPTION OF THE EMBODIMENTS

In order to make objectives, technical solutions, and advantages of this application clearer, the technical solutions of this application will be described in detail below. It is apparent that the described embodiments are only part of the embodiments of this application, not all the embodiments. All other implementations obtained by those of ordinary skill in the art on the basis of the embodiments in this application without creative work all fall within the scope of protection of this application.

Figure 1:
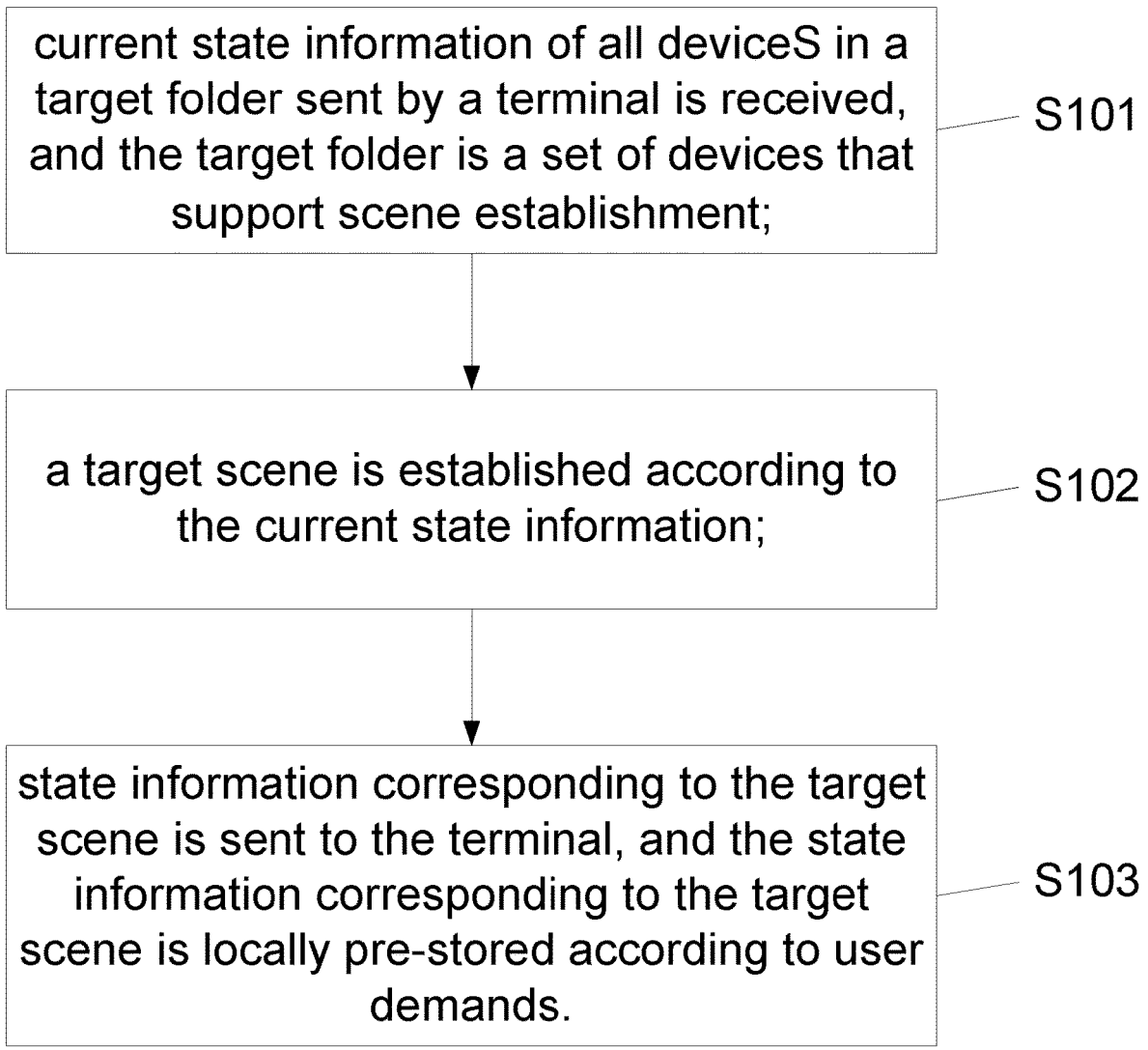
FIG. 1 is a flowchart of a method for establishing a scene according to an exemplary embodiment of this application.

FIG. 1 is a flowchart of a method for establishing a scene according to an exemplary embodiment of this application. As shown in FIG. 1, the method includes the following steps:

S101, current state information of all devices in a target folder sent by a terminal is received, and the target folder is a set of devices that support scene establishment;

S102, a target scene is established according to the current state information;

S103, state information corresponding to the target scene is sent to the terminal, and the state information corresponding to the target scene is locally pre-stored according to user demands.

In an embodiment, after the state information corresponding to the target scene is sent to the terminal, the method further includes: a request sent by the terminal to delete the target scene is received, wherein the request carries an empty target folder; and on a basis of the empty target folder, the state information corresponding to the target scene is deleted.

Figure 2:
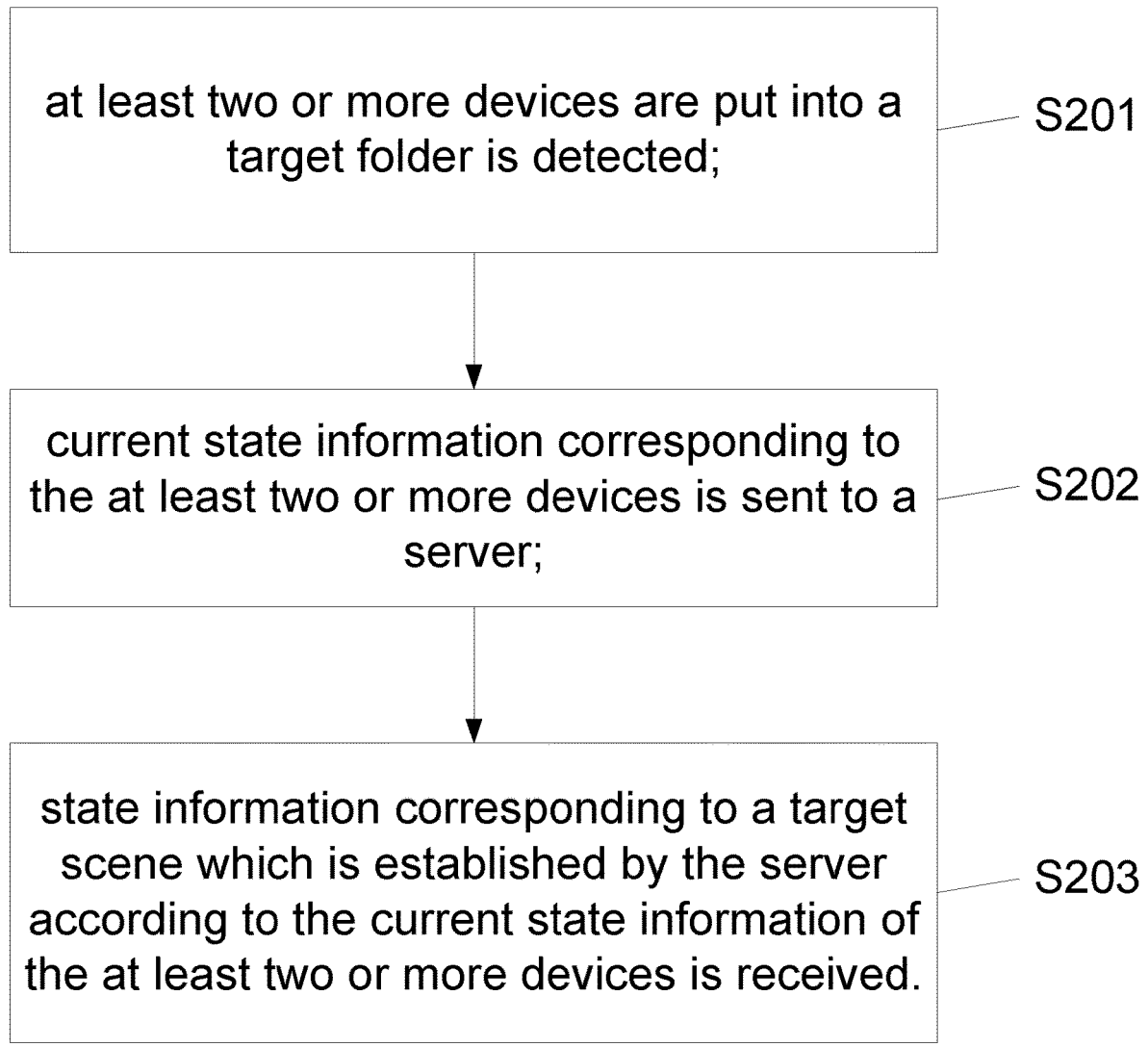
FIG. 2 is a flowchart of a method for establishing a scene according to an exemplary embodiment of this application.

FIG. 2 is a flowchart of a method for establishing a scene according to an exemplary embodiment of this application. As shown in FIG. 2, the method includes the following steps:

S201, at least two or more devices are put into a target folder is detected;

S202, current state information corresponding to the at least two or more devices is sent to a server;

S203, state information corresponding to a target scene which is established by the server according to the current state information of the at least two or more devices is received.

In an embodiment, after the state information corresponding to the target scene which is established by the server according to the current state information of the at least two or more devices is received, the method further includes: according to the state information corresponding to the target scene, the at least two or more devices are controlled to adjust to a state corresponding to the state information from a current state.

In some embodiments, a control process is triggered by means of clicking a device icon of the terminal on a page.

In an embodiment, after the state information corresponding to the target scene which is established by the server according to the current state information of the at least two or more devices are received, the method further includes: a name of the target folder that is displayed on the terminal is updated, and the name is synchronized to the server.

In some embodiments, an update operation is started by means of pressing the target folder for a bit longer.

In an embodiment, after the state information corresponding to the target scene which is established by the server according to the current state information of the at least two or more devices is received, the method further includes: a third device is put into the target folder is detected; current state information corresponding to all devices of the target folder is sent to the server; and state information corresponding to the target scene which is updated by the server according to the current state information corresponding to all the devices is received.

In an embodiment, after the state information corresponding to the target scene which is established by the server according to the current state information of the at least two or more devices is received, the method further includes: a request of deleting the target scene is received; the target folder is emptied on a basis of the request; and an empty target folder is sent to the server.

In some embodiments, a deleting operation is started by means of pressing the target folder for a bit longer.

To sum up, in this application, a scene is established by means of a simple user operation interaction method. An Application (App) on the terminal may automatically send the current state of a device to the server; the device is dragged to execute the scene; the device is clicked to execute the corresponding scene; and the device is pressed for a bit longer to enter a scene-editing mode. The above method is in line with the interaction habits of existing users, such that a learning threshold of the users is lowered, and the scene is rapidly established, thereby improving user experience of the smart home device.

The embodiments of this application are described and illustrated below with reference to specific examples.

Figure 3:
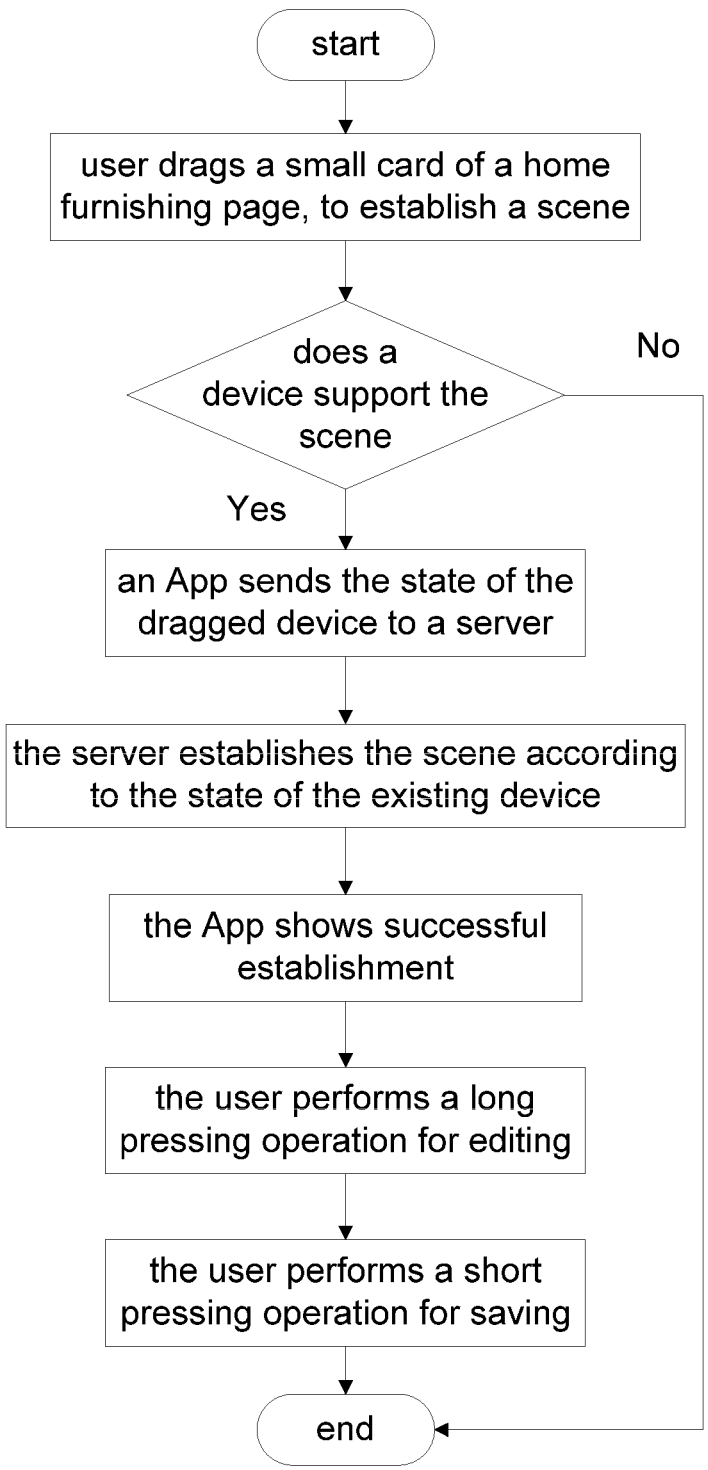
FIG. 3 is a schematic diagram of a process for establishing a scene according to an embodiment of this application.

FIG. 3 is a schematic diagram of a process for establishing a scene according to an embodiment of this application. As shown in FIG. 3, the process includes two parts, which respectively are a user interaction process and a technology realization process. Conditions required for the above processes include: 1) a network is configured for the device; and 2) the connection state of the device is normal.

The user interaction process and the technology realization process are introduced below in detail.

The user interaction process:
1. A user is on a home furnishing page of an App on a terminal.
2. The home furnishing page of the App includes two or more devices that support a scene.
3. The user drags small device cards (device icons), so as to cause the two small cards to coincide.
4. A big card similar to a "folder" is newly added to the home furnishing page, two devices that are just dragged by the user are newly added to the big card, but the original positions of the two devices are not changed.
5. After the big card is established successfully, the App sends the states of the devices when the user drags and establishes a scene to a server, then the server automatically establishes the scene, and the current device mode is an action required to be executed after the scene is triggered.
6. The user may edit the name of the scene, and the App synchronizes the name of the scene to the server.
7. The user clicks the big card, then the App provides a scene triggering signal to the server, and the server sends instructions to the devices in batches to execute the action under the scene.
8. The user may enter a scene-editing page by pressing the big card for a bit longer, so as to edit the current modes of the devices, or may set a delayed trigger scene.

The technology realization process:
1. The small device cards daily query the states of the devices in turn every 8 s and synchronize the states.
2. When the user drags the small cards to form the big card, the App sends the states of all the devices in the big card to the server.
3. The server establishes the scene according to the states of the devices sent by the App.
4. On the basis of the existing big card, if the user newly drags a device into the big card, the App sends the modes of all the devices in the big card to the server again.
5. The server updates the devices and modes under the scene.
6. If the user selects "Delete all devices" and performs saving when editing the scene, the App shows that the scene has been deleted; the App sends the devices and modes (actually, there is no device) under the scene to the server; then the server deletes the scene after updating the deleted devices and modes.

This embodiment further provides an apparatus for establishing a scene. The apparatus is configured to implement the foregoing embodiments and the preferred implementation, and what has been described will not be described again. As used below, the terms "module", "unit", "sub-unit" and the like may be a combination of software and/or hardware that implements a predetermined function. Although the apparatus described in the following embodiments is preferably implemented in software, but implementations in hardware, or a combination of software and hardware, are also possible and conceived.

Figure 4:
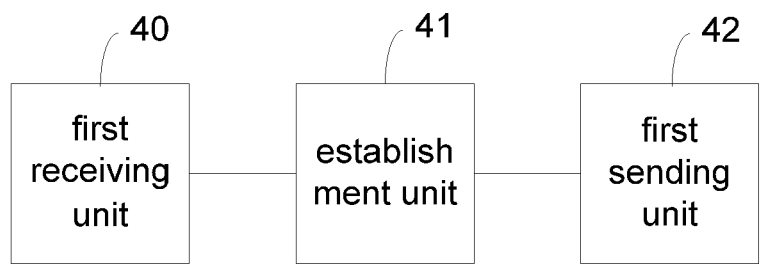
FIG. 4 is a schematic diagram of an apparatus for establishing a scene according to an exemplary embodiment of this application.

FIG. 4 is a schematic diagram of an apparatus for establishing a scene according to an exemplary embodiment of this application. As shown in FIG. 4, the apparatus includes:
  a first receiving unit 40, configured to receive current state information of all devices in a target folder sent by a terminal. The target folder is a set of devices that support scene establishment;
  an establishment unit 41, configured to establish a target scene according to the current state information;
  a first sending unit 42, configured to send state information corresponding to the target scene to the terminal. The state information corresponding to the target scene is locally pre-stored according to user demands.

In an embodiment, the first sending unit 42 is further configured, after sending the state information corresponding to the target scene to the terminal, to receive a request sent by the terminal to delete the target scene, where the request carries an empty target folder; and on a basis of the empty target folder, delete the state information corresponding to the target scene.

Figure 5:
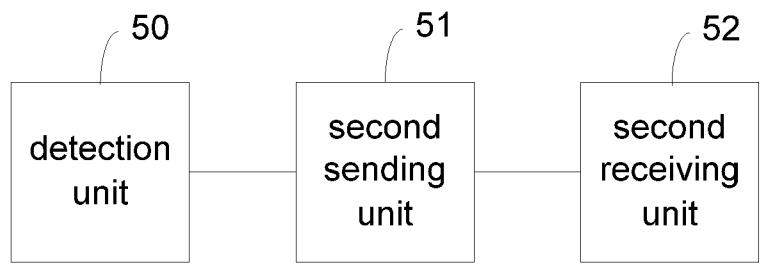
FIG. 5 is a schematic diagram of an apparatus for establishing a scene according to an exemplary embodiment of this application.

FIG. 5 is a schematic diagram of an apparatus for establishing a scene according to an exemplary embodiment of this application. As shown in FIG. 5, the apparatus includes:
  a detection unit 50, configured to detect that at least two or more devices are put into a target folder;
  a second sending unit 51, configured to send current state information corresponding to the at least two or more devices to a server;
  a second receiving unit 52, configured to receive state information corresponding to a target scene which is established by the server according to the current state information of the at least two or more devices.

In an embodiment, the second receiving unit 52 is further configured, after receiving the state information corresponding to the target scene which is established by the server according to the current state information of the at least two or more devices, to control, according to the state information corresponding to the target scene, the at least two or more devices to adjust to a state corresponding to the state information from a current state.

In an embodiment, the second receiving unit 52 is further configured, after receiving the state information corresponding to the target scene which is established by the server according to the current state information of the at least two or more devices, to update a name of the target folder that is displayed on a terminal, and synchronize the name to the server.

In an embodiment, the second receiving unit 52 is further configured, after receiving the state information corresponding to the target scene which is established by the server according to the current state information of the at least two or more devices, to detect that a third device is put into the target folder; send current state information corresponding to all devices of the target folder to the server; and receive state information corresponding to the target scene which is updated by the server according to the current state information corresponding to all the devices.

In an embodiment, the second receiving unit 52 is further configured, after receiving the state information corresponding to the target scene which is established by the server according to the current state information of the at least two or more devices, to receive a request of deleting the target scene; empty the target folder on the basis of the request; and send an empty target folder to the server.

It is to be noted that, each of the above modules may be either functional modules or program modules, and may be implemented either by means of software or hardware. For the modules implemented by means of the hardware, the modules may be located in the same processor; or the modules may also be located in different processors in any combination.

An embodiment of this application further provides a computer device. The method for establishing the scene in the embodiments of this application may be implemented by means of the computer device. The computer device in this embodiment of this application includes a memory, a processor and a computer program that is stored on the memory and executable on the processor. The processor, when executing the computer program, implements any one of the methods for establishing the scene described in the above embodiments.

An embodiment of this application further provides a computer-readable storage medium. The computer-readable storage medium stores a computer program instruction. Any one of the methods for establishing scene described in the above embodiments is implemented when the computer program instruction is executed by a processor.

It is understandable that the same or similar parts of the above embodiments may be referred to each other, and those not specified in some embodiments may be referred to the same or similar contents in other embodiments.

It is to be noted that, in the description of this application, the terms "first", "second" and the like are for descriptive purposes only, and should not be construed as indicating or implying relative importance. In addition, in the description of this application, "a plurality of" or "more" means at least two, unless otherwise specified.

It should be understood that, when one element is "fixed to" or "disposed on" the other element, the element may be directly on the other element or intermediate elements may be exist at the same time; when one element is "connected to" the other element, the element may be directly connected to the other element or intermediate elements may be exist at the same time; furthermore, "connected" as used herein may include wirelessly connected; and the word "and/or" as used includes any and all combinations of one or more of associated listed items.

Any process or method in the flowcharts or described herein in another manner may be understood to represent a module, segment or part including codes of one or more executable instructions configured to realize specific logic functions or steps of the process and, moreover, the scope of the preferred implementation mode of this application includes other implementation, not in a sequence shown or discussed herein, including execution of the functions basically simultaneously or in an opposite sequence according to the involved functions. This should be understood by those skilled in the art of the embodiments of this application.

It should be understood that, each part of this application may be implemented by hardware, software, firmware or a combination thereof. In the above embodiments, a plurality of steps or methods may be implemented by software or firmware stored in a memory and executed by a proper instruction execution system. For example, in case of implementation with the hardware, like another implementation, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art may understand that all or part of the steps in the above method embodiments may be implemented by a program to instruct related hardware, and the program may be stored in a computer-readable storage medium. When the program is executed, one of the steps of the method embodiments or a combination thereof is included.

In addition, the functional units in the various embodiments of this application may be integrated into one processing module, or each unit may exist alone physically, or two or more than two units may be integrated into one module. The above integrated module may be implemented in a form of hardware, or may be implemented in a form of a software functional module. If the integrated module is implemented in the form of the software functional module and sold or used as an independent product, it may be stored in the computer readable storage medium.

The foregoing storage medium may be an ROM, a magnetic disk, or an optical disk.

In the description of the specification, descriptions of the terms "an embodiment," "some embodiments," "example," "specific example," or "some examples", mean that specific features, structures, materials, or characteristics described with reference to the implementations or examples are included in at least one implementation or example of this application. In this specification, schematic representations of the above terms do not necessarily refer to the same embodiment or example. In addition, the described particular features, structures, materials or characteristics may be combined in any suitable manner in any one or more embodiments or examples.

Although the embodiments of this application are shown and described above, it is understandable that the above embodiments are exemplary and not to be construed as limitations of the present application, and those of ordinary skill in the art may make changes, modifications, replacements and variations of the above embodiments within the scope of this application.

What is claimed is:

1. A method for establishing a scene, comprising:

in a case that a terminal detects that at least two or more devices are put into a target folder and sends current state information corresponding to the at least two or more devices, receiving, by a server, current state information of all devices in a target folder sent by the terminal, wherein the target folder is a set of devices that support scene establishment;

establishing, by the server, a target scene according to the current state information; and sending, by the server, state information corresponding to the target scene to the terminal, so that the terminal receives the state information corresponding to the target scene, and when a third device is put into the target folder is detected, the terminal sends the current state information corresponding to all devices of the target folder to the server;

updating, by the server, state information corresponding to the target scene according to the current state information corresponding to all devices;

wherein the state information corresponding to the target scene is locally pre-stored according to user demands.

2. The method according to claim 1, wherein after sending, by the server, the state information corresponding to the target scene to the terminal, the method further comprises:

receiving, by the server, a request sent by the terminal to delete the target scene, wherein the request carries an empty target folder; and on a basis of the empty target folder, deleting, by the server, the state information corresponding to the target scene.

3. A method for establishing a scene, comprising:

detecting, by a terminal, that at least two or more devices are put into a target folder;

sending, by the terminal, current state information corresponding to the at least two or more devices to a server, so that the server receives current state information of all devices in a target folder, and establishes a target scene according to the current state information, sends state information corresponding to the target scene to the terminal, wherein the target folder is a set of devices that support scene establishment, the state information corresponding to the target scene is locally pre-stored according to user demands; and receiving, by the terminal, state information corresponding to a target scene, wherein the target scene is established by the server according to the current state information of the at least two or more devices, and when a third device is put into the target folder is detected, sending, by the terminal, the current state information corresponding to all devices of the target folder to the server, so that the server updates state information corresponding to the target scene according to the current state information corresponding to all devices.

4. The method according to claim 3, wherein after receiving, by the terminal, the state information corresponding to the target scene which is established by the server according to the current state information of the at least two or more devices, the method further comprises:

controlling, by the terminal, according to the state information corresponding to the target scene, the at least two or more devices to adjust to a state corresponding to the state information from a current state.

5. The method according to claim 3, wherein after receiving, by the terminal, the state information corresponding to the target scene which is established by the server according to the current state information of the at least two or more devices, the method further comprises:

updating, by the terminal, a name of the target folder that is displayed on the terminal, and synchronizing, by the terminal, the name to the server.

6. The method according to claim 3, wherein receiving, by the terminal, the state information corresponding to the target scene which is established by the server according to the current state information of the at least two or more devices, the method further comprises:

detecting, by the terminal, that the third device is put into the target folder;

sending, by the terminal, current state information corresponding to all devices of the target folder to the server; and receiving, by the terminal, state information corresponding to the target scene which is updated by the server according to the current state information corresponding to all the devices.

7. The method according to claim 3, wherein receiving, by the terminal, the state information corresponding to the target scene which is established by the server according to the current state information of the at least two or more devices, the method further comprises:

receiving, by the terminal, a request of deleting the target scene;

emptying, by the terminal, the target folder on a basis of the request; and sending, by the terminal, an empty target folder to the server.

8. A computer device, comprising a memory, a processor and a computer program that is stored on the memory and executable on the processor, wherein the processor, when executing the computer program, implements the method according to claim 1.

9. The computer device according to claim 8, wherein after sending, by the server, the state information corresponding to the target scene to the terminal, the method further comprises:

receiving, by the server, a request sent by the terminal to delete the target scene, wherein the request carries an empty target folder; and on a basis of the empty target folder, deleting, by the server, the state information corresponding to the target scene.

10. A computer-readable storage medium, having a computer program stored thereon, wherein the method according to claim 1 is implemented when the program is executed by a processor.

11. A computer device, comprising a memory, a processor and a computer program that is stored on the memory and executable on the processor, wherein the processor, when executing the computer program, implements the method according to claim 3.

12. The computer device according to claim 11, wherein after receiving the state information corresponding to the target scene which is established by the server according to the current state information of the at least two or more devices, the method further comprises:

controlling, by the terminal, according to the state information corresponding to the target scene, the at least two or more devices to adjust to a state corresponding to the state information from a current state.

13. The computer device according to claim 11, wherein after receiving, by the terminal, the state information corresponding to the target scene which is established by the server according to the current state information of the at least two or more devices, the method further comprises:
    updating, by the terminal, a name of the target folder that is displayed on the terminal, and synchronizing, by the terminal, the name to the server.

14. The computer device according to claim 11, wherein receiving, by the terminal, the state information corresponding to the target scene which is established by the server according to the current state information of the at least two or more devices, the method further comprises:
    detecting, by the terminal, that the third device is put into the target folder;
    sending, by the terminal, current state information corresponding to all devices of the target folder to the server; and
    receiving, by the terminal, state information corresponding to the target scene which is updated by the server according to the current state information corresponding to all the devices.

15. The computer device according to claim 11, wherein receiving, by the terminal, the state information corresponding to the target scene which is established by the server according to the current state information of the at least two or more devices, the method further comprises:
    receiving, by the terminal, a request of deleting the target scene;
    emptying, by the terminal, the target folder on a basis of the request; and
    sending, by the terminal, an empty target folder to the server.

* * * * *